(12) United States Patent
Ito et al.

(10) Patent No.: US 11,632,906 B2
(45) Date of Patent: Apr. 25, 2023

(54) ELECTRIC GRASS CUTTING MACHINE

(71) Applicant: Kubota Corporation, Osaka (JP)

(72) Inventors: Hirokazu Ito, Sakai (JP); Katsuhiko Uemura, Sakai (JP); Kazuaki Matsuda, Sakai (JP)

(73) Assignee: Kubota Corporation, Osaka (JP)

( * ) Notice: Subject to any disclaimer, the term of this patent is extended or adjusted under 35 U.S.C. 154(b) by 656 days.

(21) Appl. No.: 16/688,237

(22) Filed: Nov. 19, 2019

(65) Prior Publication Data
US 2020/0205343 A1 Jul. 2, 2020

(30) Foreign Application Priority Data

Dec. 26, 2018 (JP) .............................. JP2018-243331

(51) Int. Cl.
| | | |
|---|---|---|
| *A01D 43/063* | (2006.01) | |
| *A01D 34/64* | (2006.01) | |
| *A01D 34/71* | (2006.01) | |
| *A01D 101/00* | (2006.01) | |

(52) U.S. Cl.
CPC ........... *A01D 43/063* (2013.01); *A01D 34/64* (2013.01); *A01D 34/71* (2013.01); *A01D 2101/00* (2013.01)

(58) Field of Classification Search
CPC ...... A01D 43/063; A01D 34/64; A01D 34/71; A01D 2101/00; A01D 67/00; A01D 69/06; A01D 69/02; A01D 34/66; A01D 2034/645
See application file for complete search history.

(56) References Cited

U.S. PATENT DOCUMENTS

| | | | |
|---|---|---|---|
| 6,431,305 B1 | 8/2002 | Ishimori et al. | |
| 7,263,819 B2 | 9/2007 | Samejima et al. | |
| 2001/0000562 A1* | 5/2001 | Abend ................. | B60K 17/105 180/374 |
| 2008/0264026 A1 | 10/2008 | Ishii et al. | |
| 2009/0126328 A1* | 5/2009 | Shimizu ............... | A01D 43/063 56/16.6 |
| 2010/0236845 A1* | 9/2010 | Ishii ..................... | B60K 7/0007 74/606 R |
| 2011/0155486 A1 | 6/2011 | Iwawki et al. | |
| 2011/0247886 A1 | 10/2011 | Sasahara et al. | |
| 2015/0096280 A1* | 4/2015 | Vondracek ............ | A01D 34/66 56/255 |

(Continued)

FOREIGN PATENT DOCUMENTS

| | | |
|---|---|---|
| EP | 2332760 A1 | 6/2011 |
| EP | 3219194 A1 | 9/2017 |

(Continued)

*Primary Examiner* — Darlene P Condra
(74) *Attorney, Agent, or Firm* — The Webb Law Firm

(57) ABSTRACT

In an electric grass cutting machine relating to the present invention, an electric motor for driving a traveling device having a pair of left and right front wheels and a pair of left and right rear wheels and a gear transmission for speed-changing output from the electric motor and transmitting the resultant power to the traveling device are disposed between the left and right rear wheels and arranged one after the other in the front/rear direction at positions laterally of a conveying duct for guiding cut grass pieces from a rear discharge type mower device to a grass collecting container supported to a rear portion of a machine body frame.

9 Claims, 5 Drawing Sheets

(56) References Cited

U.S. PATENT DOCUMENTS

| | | | |
|---|---|---|---|
| 2016/0014962 A1* | 1/2016 | Hoppel | A01D 43/0635 56/16.8 |
| 2016/0057924 A1* | 3/2016 | Asahara | A01D 34/64 180/312 |
| 2017/0087976 A1* | 3/2017 | Tsuchihashi | F01N 3/021 |
| 2017/0135283 A1* | 5/2017 | Ito | A01D 34/81 |
| 2017/0265384 A1 | 9/2017 | Tanabe et al. | |
| 2018/0026244 A1* | 1/2018 | Ito | H01M 50/256 429/96 |

FOREIGN PATENT DOCUMENTS

| | | |
|---|---|---|
| JP | 200186831 A | 4/2001 |
| JP | 2008263921 A | 11/2008 |
| JP | 2008265685 A | 11/2008 |
| JP | 2011218951 A | 11/2011 |
| JP | 2013248918 A | 12/2013 |
| JP | 2016193651 A | 11/2016 |

* cited by examiner

ELECTRIC GRASS CUTTING MACHINE

CROSS-REFERENCE TO RELATED APPLICATION

This application claims priority to Japanese Patent Application No. 2018-243331 filed Dec. 26, 2018, the disclosure of which is hereby incorporated by reference in its entirety.

FIELD OF THE INVENTION

The present invention relates to an electric grass cutting machine including a traveling device, a mower device, a grass collecting container and an electric motor for driving the traveling device.

BACKGROUND ART

As an electric grass cutting machine having an electric motor for driving a traveling device, as disclosed in Patent Document 1, there is known one configured such that each one of a pair of left and right rear wheels or each one of a pair of left and right front wheels is equipped with an electric motor (see Patent Document 1 for example).

BACKGROUND ART DOCUMENT

Patent Document

Patent Document 1: Japanese Unexamined Patent Application Publication No. 2011-218951 publication document

SUMMARY OF THE INVENTION

Problem to be Solved by Invention

In the above-described configuration, since an electric motor is provided for each one of a pair of left and right wheels, the frequency of use of the electric motor(s) or a speed reduction mechanism tends to be high. Further, a space for layout of the configuration tends to occupy a large area between the left and right wheels, which in turn tends to "squeeze" the space required for laying out a conveying duct for conveying cut grass pieces from the mower device to the grass collecting device.

The present invention intends to provide an electric grass cutting machine that can reduce the frequency of use of an electric motor driving a traveling device and can also reduce its disposing space and that allows cost reduction and compactization of the machine.

Solution

According to a characterizing feature of the present invention, an electric grass cutting machine comprises:

a traveling device having a pair of left and right front wheels and a pair of left and right rear wheels;

a mower device of a rear discharge type disposed under a machine body frame;

a grass collecting container supported to a rear portion of the machine body frame;

an electric motor configured to drive the traveling device; and a gear transmission configured to speed-change an output from the electric motor and to transmit the speed-changed output to the traveling device;

wherein the electric motor and the gear transmission are disposed between the left and right rear wheels and arranged one after the other in the front/rear direction at positions laterally of a conveying duct for guiding cut grass pieces from the mower device to the grass collecting container.

With the above-described inventive configuration, the electric motor and the gear transmission are disposed, not relative to the individual wheel, but between the left and right rear wheels, one after the other in the front/rear direction at positions laterally of a conveying duct for guiding cut grass pieces from the mower device to the grass collecting container.

Therefore, the output from the electric motor can be distributed via the gear transmission to the wheels at their respective positions, so that it is readily possible to reduce the frequency of use of the electric motor and the gear transmission. Moreover, even when a relatively compact electric motor is employed, it is still readily possible to obtain a required high output via the gear transmission.

Further, since the electric motor and the gear transmission are arranged one after the other not in the left/right direction or the vertical direction, but in the front/rear direction, there is no need to increase the left/right width and/or the vertical width of the disposing area for the electric motor and the gear transmission. Accordingly, it is readily possible to effectively utilize the space available between the left and right wheels as the disposing area for the electric motor and the gear transmission. Moreover, as the vertical width need not be reduced or the vehicle height need not be increased unnecessarily, the inventive arrangement is advantageous also in the respect of readiness of compactization of the machine body.

In the above-described configuration, preferably, the electric motor is supported to a transmission case that accommodates the gear transmission.

With the above-described inventive configuration, since a transmission case can be utilized as a "supporting means" for the electric motor, the supporting arrangement for the electric motor can be readily simplified.

In the above-described inventive configuration, preferably:

the electric motor is an oil cooled type having a cooling jacket; and an amount of oil charged in the transmission case is supplied in circulation to the cooling jacket.

With the above-described inventive configuration, oil fed/discharged to/from the cooling jacket of the electric motor is circulated to/from the transmission case having an inside space set with a relatively large surface area. With this, discharge heat from the transmission case present in the circulation passage can be effectively utilized as a "cooling means" for the oil.

And, as the electric motor and the transmission are arranged one after the other in the front/rear direction, by connecting the electric motor and the transmission case disposed one after the other to each other, a cooling pipe to be provided between the cooling jacket and the transmission case can be designed short easily.

In the above-described inventive configuration, preferably, an oil cooler is incorporated in an oil circulation circuit to the cooling jacket.

With the above-described inventive configuration, since an oil cooler is incorporated in an oil circulation circuit to the cooling jacket, the electric motor can be cooled in a reliable manner.

In the above-described inventive configuration, preferably, in a front hood provided at a front portion of the machine body frame, there is accommodated a battery for feeding electric power to the electric motor.

With the above-described inventive configuration, the battery which is a heavy object is located at the machine body front portion. So, it is readily possible to maintain favorable front/rear balance relative to e.g. a weight of a grass collecting container which is disposed at a rear portion of the machine body. Further, it is readily possible to avoid adherence of rainwater or dust to the battery as this battery is accommodated in the front hood.

In the above-described inventive configuration, preferably:

a left/right width of a pair of left and right main frames included in the machine body frame is set, at its front portion, to a width approximating a left/right width of the battery and set, at its rear portion, to a width which is greater than the width of the front portion and approximates a sum total of a left/right width of the electric motor and a left/right width of the conveying duct.

With the above-described inventive configuration, since the front portion of the main frames has a smaller width, it is possible to secure a large operational area for the front wheels which are steered. Further, as the width of this front portion is set to a width approximating the left/right width of the battery, it is readily possible to support the battery as a heavy object.

And, as the rear portion of the main frames has a width greater than the front portion, the layout of the electric motor and the conveying duct can be made easily without reducing the right/left width of the conveying duct.

In the above-described inventive configuration, preferably:

the mower device includes a cutter blade housing that covers a plurality of rotary blades;

the mower device is supported to be movable to/from between an upper position close to the machine body frame and a lower position away from the machine body frame; and the electric motor is disposed, relative to the mower device located at the upper position, at a position overlapped with the cutter blade housing in the front/rear direction, at a position offset from rotational paths of the rotary blades as seen in a plan view.

With the above-described inventive configuration, since the electric motor is disposed at a position overlapped in the front/rear direction with the cutter blade housing located at its upper position, it is possible to secure the disposing area for the electric motor and the transmission case to be arranged one after the other in the front/rear direction, without increasing the wheelbase significantly.

And, since the electric motor is located at a position off the rotational paths of the rotary blades as seen in the plan view, it is also possible to set the upper face of the cutter blade housing low with avoiding interference with the rotary blades. Therefore, the mower device having the cutter blade housing overlapped with the electric motor can be elevated to an even higher position.

EMBODIMENT

Next, an embodiment as an example of the present invention will be explained with reference to the accompanying drawings.

Figure 1:
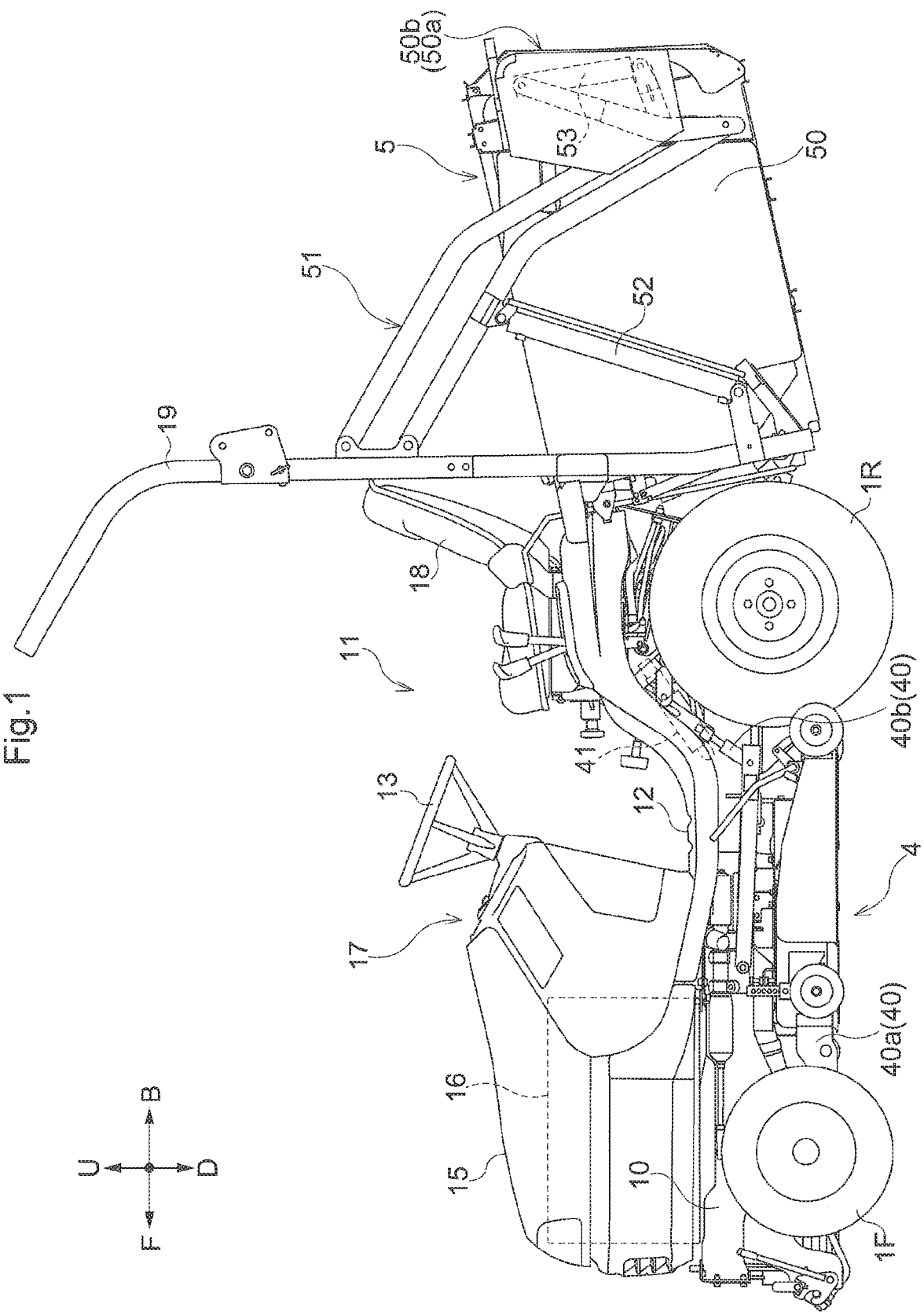
FIG. 1 is a left side view showing an electric grass cutting machine in its entirety.
Figure 2:
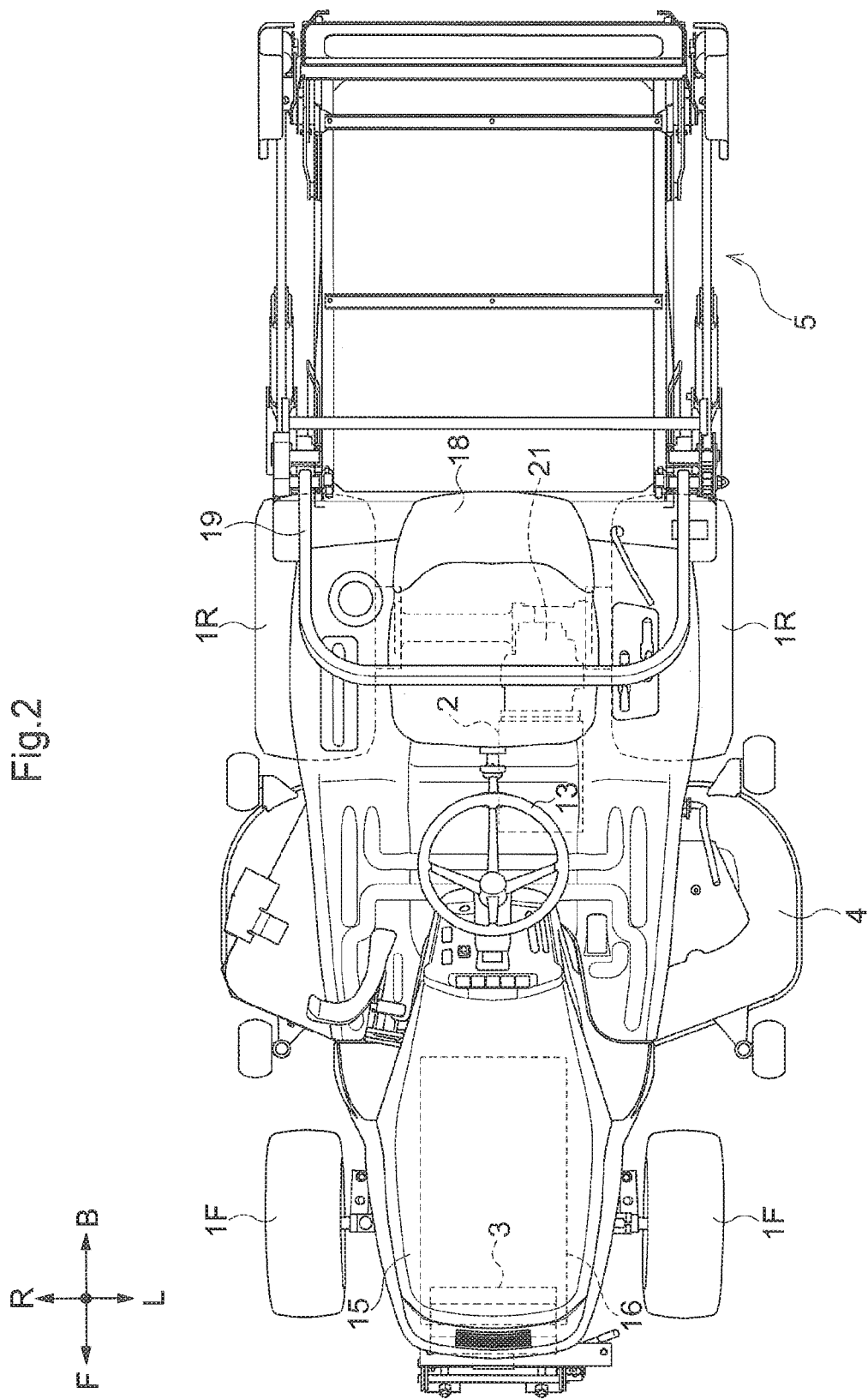
FIG. 2 is a plan view showing the electric grass cutting machine in its entirety.

Incidentally, in the following explanation, with respect to a vehicle body of an electric grass cutting machine, as shown in FIGS. 1 and 2, the direction of an arrow F is defined as "vehicle body front side", the direction of an arrow B is defined as "vehicle body rear side", and as shown in FIG. 1, the direction of an arrow U is defined as "vehicle body upper side", the direction of an arrow D is defined as "vehicle body lower side", and as shown in FIG. 2, the direction of an arrow L is defined as "vehicle body left side" and the direction of an arrow R is defined as "vehicle body right side", respectively.

[General Configuration of Electric Grass Cutting Machine]

FIG. 1 shows an overall side view of an electric grass cutting machine and FIG. 2 shows an overall plan view of the electric grass cutting machine. This electric grass cutting machine is configured such that a pair of left and right steerable front wheels 1F are provided on the front side of a machine body frame 10 of a traveling machine body and on the rear side thereof, a pair of drivable left and right rear wheels 1R are provided for self-propelling of the machine. A steering operation of the front wheels 1F is carried out by a power steering device 14 (see FIG. 3) which in turn is operated by a steering operation on a steering wheel 13 to be described later.

Downwardly of the machine body frame 10 and between the front wheels 1F and the rear wheels 1R in the front/rear direction, a rear discharge type mower device 4 is mounted and suspended to be liftable up/down. On the rear side of the traveling machine body, there is provided a grass collecting device 5 for collecting cut grass pieces cut by the mower device 4.

As shown in FIG. 1 and FIG. 2, on the machine body frame 10 of the traveling machine body, a front hood 15 is provided at its front portion. And, in this front hood 15, a battery 16 for electric power supply is accommodated. On the rear side of the front hood 15, a riding driving section 11 is provided.

In the riding driving section 11, a driving section step 12 liftable up/down by a driver is provided and on the font side of this driving section step 12, a steering operational section 17 having the steering wheel 13 is provided, and on the rear side across the driving section step 12, a driver's seat 18 is provided. At a rear portion of the driver's seat 18, a ROPS 19 having a portal shape as seen in the front/rear direction is mounted vertically from the rear end portion of the machine body frame 10.

The battery 16 accommodated in the front hood 15 is provided for supplying electric power to a traveling motor 2 to be described later (corresponding to an "electric motor" in the present invention), and to an implement motor 3, etc.

The implement work motor 3 is provided for supplying power to a blade driving mechanism (not shown) of the mower device 4 for rotatably driving rotary blades 43. This implement work motor 3 is provided at a front lower position of the front hood 15 and supported to the front end portion of the machine body frame 10. Power of the implement work motor 3 is transmitted to the blade driving mechanism via a PTO shaft (not shown) for transmitting power to the mower device 4 whose vertical position can be changed.

[Mower Device]

The mower device 4 includes a cutter blade housing 42 that is supported to the machine body frame 10 to be liftable up/down, via a link mechanism 40 having a pair of front link 40a and a rear link 40b on the left and right opposed sides thereof.

In the link mechanism 40, to the upper end portion of the rear link 40b, a mower lift cylinder 41 is operably connected. In association with an expansion/contraction operation of this mower lift cylinder 41, the vertical position of the cutter blade housing 42 relative to the machine body frame 10 can be changed.

Inside the cutter blade housing 42, the rotary blades 43 are disposed at three positions. The rotary blades 43 include a center rotary blade 43a located at the approximate center in the machine body left/right direction and provided on the front side, and side rotary blades 43b, 43b which are located on the left and right opposed sides and slightly rearwards.

Each rotary blade 43 is rotated about a vertical axis and the rotary blades 43 are arranged such that the rotational path Rb of each side rotary blade 43b, 43b is partially overlapped in the left/right direction with the rotational path Ra of the center rotary blade 43a. With this arrangement, due to the slight overlapping between the passage of the rotational path Ra of the center rotary blade 43a on the front side and the passage of the rotational path Rb of the respective side rotary blade 43b, 43b on the rear side, the blades are rotationally driven under a condition providing less possibility of uncut.

Of the rotary blades 43 at the three positions, the left side rotary blade 43b and the center rotary blade 43a are rotated clockwise as seen in the plan view, whereas the right side rotary blade 43b is rotated counterclockwise. And, an entrance 44a of a conveying duct 44 for guiding cut grass pieces rearwards is located between the center rotary blade 43a and the right side rotary blade 43b.

Cut grass pieces will be sent from the left side rotary blade 43b toward the center rotary blade 43a and through a cut grass passage 42a inside the cutter blade housing 42. Cut grass pieces will be sent also from the right side rotary blade 43b toward the center rotary blade 43a and through the cut grass passage 42a inside the cutter blade housing 42. These cut grass pieces will be conveyed together with grass pieces cut by the center rotary blade 43a and fed together into the entrance 44a of the conveying duct 44 and will be sent into the grass collecting device 5 on the rear side, as being guided by the conveying duct 44 by a conveying air current generated in association with rotational movements of the rotary blades 43.

In the cutter blade housing 42, at its upper face covering the respective rotary blades 43, at a portion thereof opposed to the portions corresponding to the front portion of the rotational paths Ra, Rb of the respective rotary blades 43 form the cut grass passage 42a bulging to the upper side. And, on the rear side of the left and right side rotary blades 43b, 43b, at a position in the front/rear direction approximating that of a tangent to the outer circumferential edge of the rotational path Rb, a rear end edge 42b of the cutter blade housing 42 is formed straight.

Between this rear end edge 42b of the cutter blade housing 42 and the rear end edge of the rotational path Ra of the center rotary blade 43a, there exists an area not overlapped, as seen in a plan view, with either one of the rotational paths Ra, Rb of the rotary blades 43, this area is utilized as a disposing area 42c for the front portion of the traveling motor 2. The upper face of this disposing area 42c is located at a position significantly lower than the upper face of the cut grass passage 42a and staying clear of the rotational paths Ra, Rb of the respective rotary blades 43, either, so it may be set also at a position having a height similar to the disposing portion of the respective rotary blades 43 or at a position equal to or lower than the disposing position.

Figure 3:
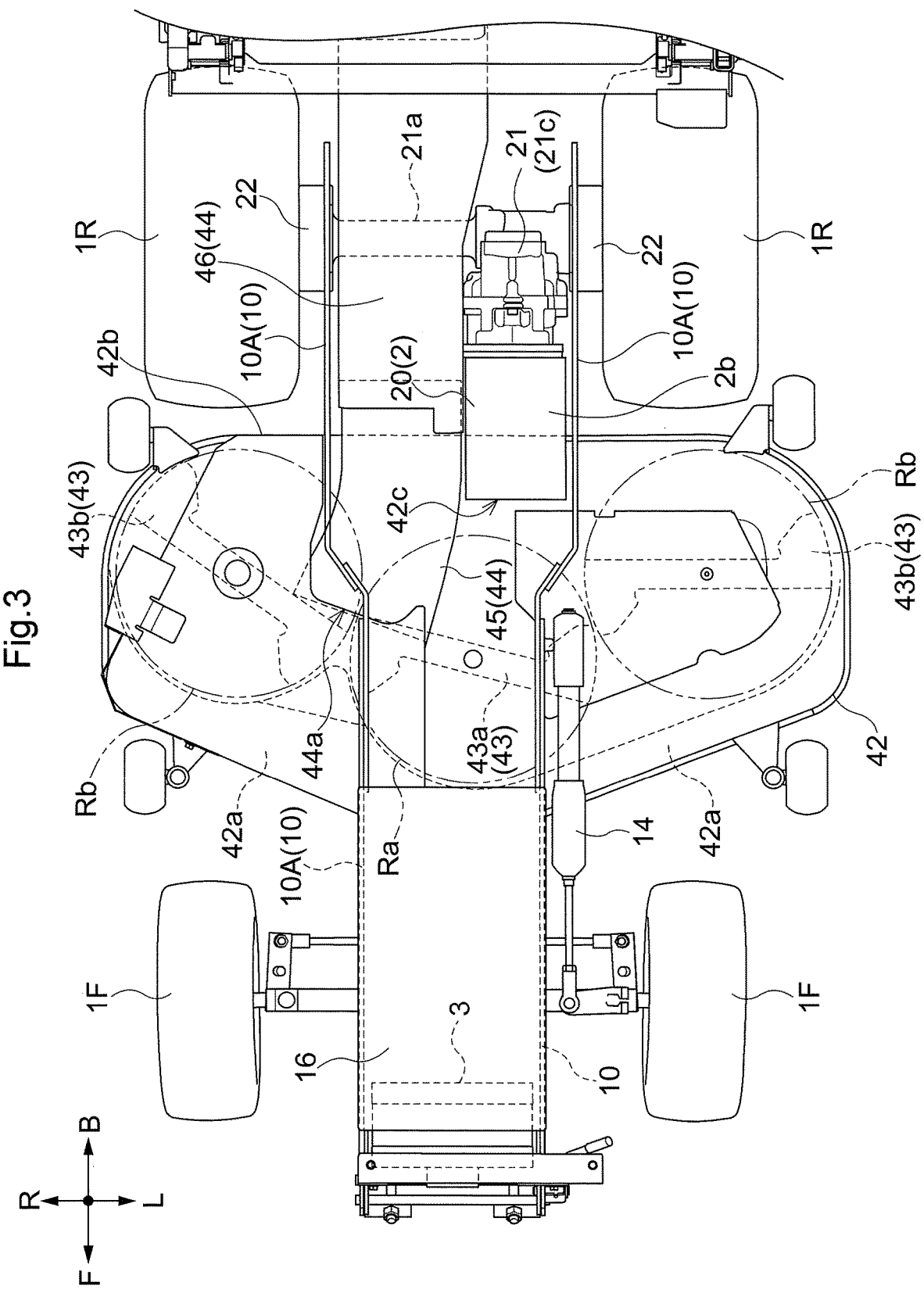
FIG. 3 is an explanatory view illustrating position relations as seen in a plan view, of a battery, a mower device, an electric motor, a transmission case and a conveying duct respectively relative to a machine body frame.
Figure 4:
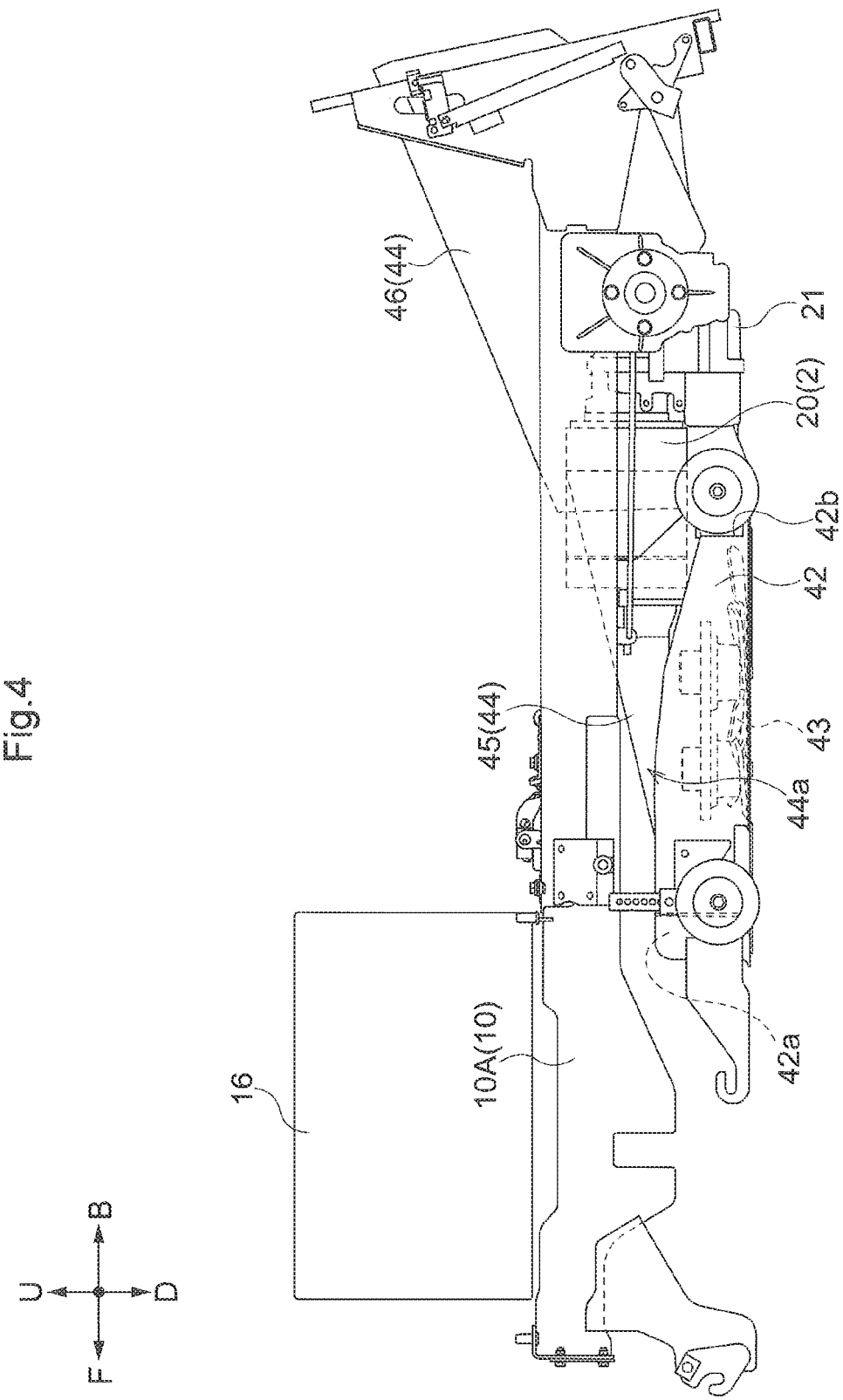
FIG. 4 is an explanatory view illustrating the position relations as seen in a side view, of the battery, the mower device, the electric motor, the transmission case and the conveying duct respectively relative to the machine body frame.

The conveying duct 44, as shown in FIG. 3 and FIG. 4, includes an inlet side duct portion 45 provided integrally with the cutter blade housing 42 and a fixed side duct portion 46 fixed to the machine body frame 10 side. The inlet side duct portion 45 and the fixed side duct portion 46 respectively has a channel-like cross sectional shape which is opened downwards, with the front end portion of the fixed side duct portion 46 hanging from above over the rear end portion of the inlet side duct portion 45.

Therefore, when the mower device 4 is under its suspended non-working posture, the inlet side duct portion 45 and the fixed side duct portion 46 are under a condition wherein the rear end portion upper face of the inlet side duct portion 45 is placed in contact with or in close vicinity of the underside of the front end upper face of the fixed side duct portion 46.

And, when the mower device 4 is under a working posture located at its lowered position, the inlet side duct portion 45 is lowered in association with a lowing movement of the mower device 4 and there occurs no change in the position of the fixed side duct portion 46 fixed to the machine body frame 10, so the rear end upper face of the inlet side duct portion 45 will be located downwardly away from the front end upper face of the fixed side duct portion 46 (see FIG. 4). Under this condition, inside the conveying duct 44, there are constituted a series of cut grass conveying passages that convey cut grass pieces from the mower device 4 to the grass collecting device 5.

The conveying duct 44, as shown in FIG. 3, passes between the left and right rear wheels 1R, 1R and extends rearwards. The left and right rear wheels 1R, 1R are disposed on the laterally outer sides of the left and right machine body frame 10 and the conveying duct 44 is disposed at a position on more right side than the center position between the left and right machine body frames 10, 10 and adjacent from the machine body inner side to the lateral face of the right machine body frame 10. With this arrangement, on the left side of the conveying duct 44 and relative to the left machine body frame 10, there is secured a disposing space for disposing the traveling motor 2.

[Grass Collecting Device]

The grass collecting device 5 for storing an amount of cut grass pieces cut by the mower device 4 is attached to the ROPS 19.

The grass collecting device 5 includes a pair of left and right link mechanisms 51 whose front end portions are attached to the ROPS 19 and a grass collecting container 50 attached to the rear end portions of the link mechanisms 51. The link mechanism 51 is mounted to be liftable up/down by a lift cylinder 52 provided to/between the lower end portion of the ROPS 19 and an intermediate portion of the link mechanism 51.

The grass collecting container 50 attached to the rear end portions of the link mechanisms 51 is lifted up/down by the link mechanisms 51 and the lift cylinders 52 between a lowered storing posture and an elevated discharging posture.

Under the lowered storing posture, a cut grass inlet (not shown) of the front portion of the grass collecting container 50 is communicated to the conveying duct 44 (see FIG. 3) that guides cut grass pieces from the mower device 4 to the grass collecting container 50. Under the elevated discharging posture, the cut grass inlet is upwardly away from the conveying duct 44.

At the rear portion of the grass collecting container 50, there are provided a discharge outlet 50a and a lid body 50b for opening/closing the discharge outlet 50a. The lid body 50b has its lower side openable relative to its upper side which acts as the pivot, in association with an operation of a dump cylinder 53 provided as an opening/closing mechanism. And, by opening the lid body 50b under the elevated discharge posture, an amount of cut grass pieces stored in the grass collecting container 50 will be discharged under the gravity through the discharge outlet 50a.

[Machine Body Frame]

As shown in FIG. 3, the machine body frame 10 includes a pair of left and right main frames 10A, 10A extending along the machine body front/rear direction. The left/right width of front portions of these main frames 10A, 10A as seen in the plan view is set smaller than the left/right width of the front hood 15. Therefore, the front hood 15 on more laterally outer side of the main frames 10A, 10A has its lower side opened for facilitating introduction of ambient air.

Further, the left/right width of the, main frames 10A, 10A at the portion which is located within the space of the front hood 15 as seen in the plan view is set approximately equal to the left/right width of the battery 16 accommodated in this front hood 15, thus allowing the main frames 10A, 10A to easily and firmly support the battery 16 at position close to the left and right opposed portions of the battery 16.

On more rear side than the front hood 15, the left/right width of the main frames 10A, 10A as seen in the plan view is set greater than the left/right width of the main frames 10A, 10A at the front portions.

The left/right width of the main frames 10A, 10A at the wide portions is a width approximating the spacing between the left and right rear wheels 1R, 1R, namely being set to a value close to a sum total of the left/right width of the conveying duct 44 and the left/right width of the traveling motor 2 provided aside this conveying duct 44.

[Traveling Driving System]

In the traveling driving system of the electric grass cutting machine, there are provided the traveling motor 2 and a gear transmission 21c.

The traveling motor 2 includes a cylindrical outer case 20 disposed under a posture having a rotational center of a rotor (not shown) and an axial direction of an output shaft (not shown) both aligned with the front/rear direction. As this outer case 20 is disposed on the front side of the transmission case 21 accommodating the gear transmission 21c, the rear end side is supported to the transmission case 21.

The traveling motor 2, as shown in FIG. 3 and FIG. 4, is disposed between the left main frames 10A and the conveying duct 44, with the upper half portion of the outer case 20 being overlapped with the main frames 10A of the machine body frame 10 as seen in the side view.

As seen in the plan view, as shown in FIG. 3 and FIG. 4, the front portion of the outer case 20 is overlapped with the cutter blade housing 42 of the mower device 4.

In the upper face of the cutter blade housing 42 of the mower device 4, between the rear end edge 42b of the cutter blade housing 42 and the rear end edge of the rotational path Ra of the center rotary blade 43a, there exits an area not overlapped with either of the rotational paths Ra, Rb of either rotary blades 43 as seen in the plan view. And, the relative position between the cutter blade housing 42 and the outer case 20 is set such that the front portion of the traveling motor 2 may be overlapped with this area.

The traveling motor 2 is of an oil cooled type having a cooling jacket 2b inside the outer case 20 and an amount of oil discharged from the cooling jacket 2b may be fed into the transmission case 21.

An oil passage extending through the cooling jacket 2b of this traveling motor 2 will be described later.

The transmission case 21, in order to serve also as an "axle case" for supporting the left and right rear wheels 1R, includes axle support portions 22 formed integrally with its left and right opposed end portions.

This transmission case 21 is configured such that power transmitted from the output shaft of the traveling motor 2 is speed-changed by the gear transmission 21c accommodated therein and the resultant speed-changed power may be transmitted as driving forces to the rear wheels 1R. In the transmission case 21, its axle case portion 21a having the smallest diameter is disposed to pass under the conveying duct 44 and the power from the transmission case 21 is transmitted in distribution to the left and right rear wheels 1R.

[Oil Cooling Circuit]

Figure 5:
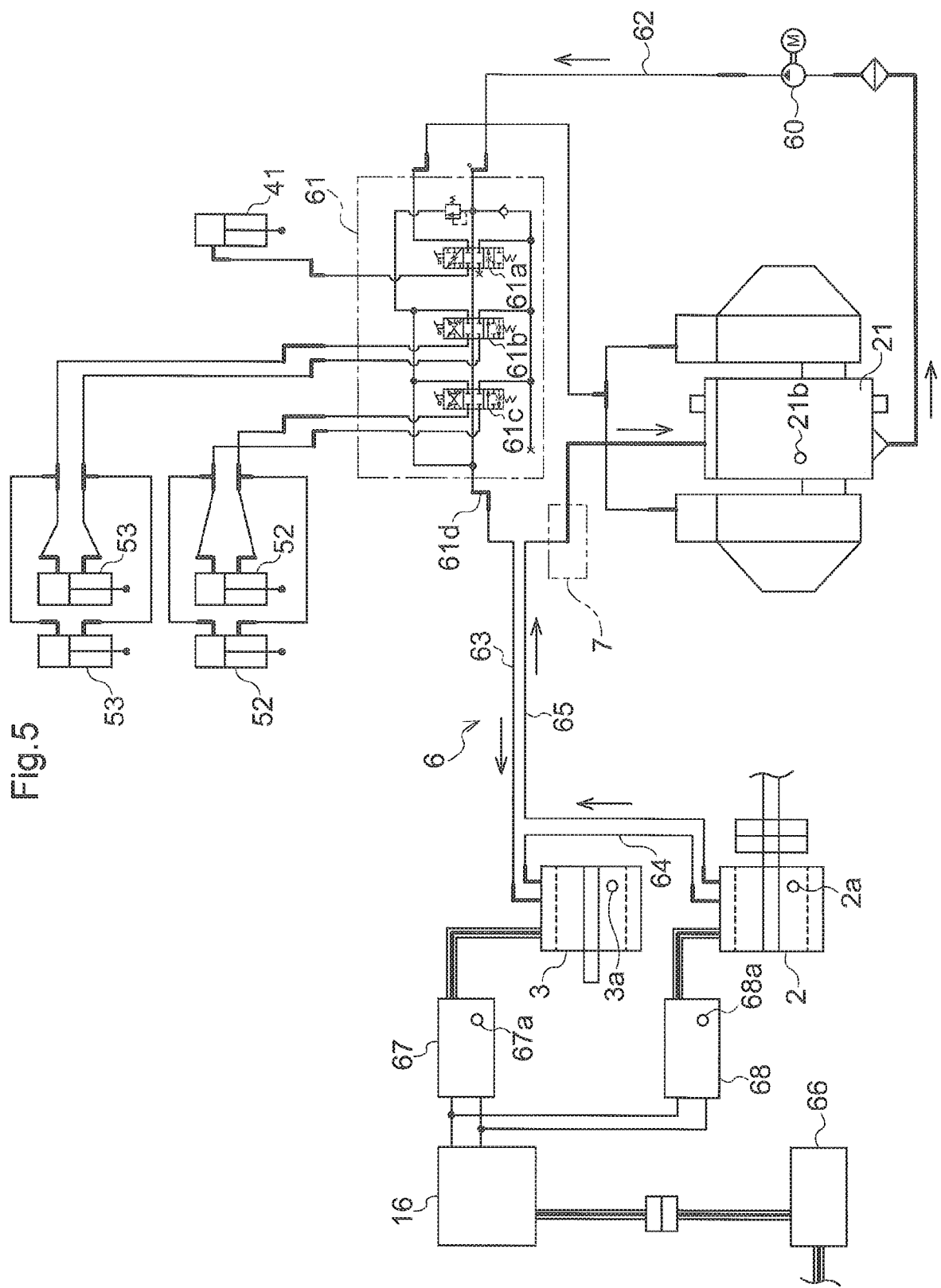
FIG. 5 is an oil cooling circuit diagram representing an oil circulation system between a cooking jacket of the electric motor and the transmission case.

As shown in FIG. 5, a cooling circuit 6 (corresponding to an "oil circulation circuit" in this invention) is connected to the implement work motor 3 and the traveling motor 2.

With this cooling circuit 6, an amount of lubricant oil reserved in the transmission case 21 is circulated as a coolant under a pumping action of a hydraulic pump 60, between the transmission case 21 and the implement work motor 3 and between the transmission case 21 and the traveling motor 2, thereby to cool the implement work motor 3 and the traveling motor 2.

The cooling circuit 6 includes an operational valve device 61 having operational valves 61a, 61b, 61c for feeding/discharging pressure oil for operation to/from the mower lift cylinder 41 of the mower device 4, the lift cylinder 52 of the grass collecting device 5 and the dump cylinder 53, respectively.

Specifically, the cooling circuit 6 includes an oil supply passage 62 for taking out the lubricant oil reserved in the transmission case 21 by the hydraulic pump 60 and supplying it to the operational valve device 61, a first feeding oil passage 63 for feeding the lubricant oil discharged from a power beyond port 61d of the operational valve device 61 to the implement work motor 3 as a coolant, a second feeding oil passage 64 cooling the implement work motor 3 and feeding the lubricant oil discharged from this implement work motor 3 to the traveling motor 2 as a coolant, and a returning oil passage 65 for cooling the traveling motor 2 and returning the lubricant oil discharged from this traveling motor 2 to the transmission case 21.

A sign (numeral) 66 shown in FIG. 5 denotes a charger for charging the battery 16. A sign (numeral) 67 shown in FIG. 5 denotes an implement inverter for supplying the power of the battery 16 to the implement work motor 3. A sign (numeral) 68 shown in FIG. 5 denotes a traveling inverter for supplying the power of the battery 16 to the traveling motor 2.

Advantageously, a temperature sensor 3a for detecting an inside temperature of the implement work motor 3, a temperature sensor 2a for detecting an inside temperature of the traveling motor 2, a temperature sensor 21b for detecting an inside temperature of the transmission case 21, a temperature sensor 67a for detecting a temperature of the implement inverter 67, a temperature sensor 68a for detecting a temperature of the traveling inverter 68 and also a control device for controlling the driving rotational speed or the flow rate of the hydraulic pump 60 based on the detections results of the temperature sensors 3a, 2a, 21b, etc., may be provided.

By driving the hydraulic pump 60 at a rated rotation at the time of driving of the mower lift cylinder 41, the lift cylinder 52 of the grass collecting device 5 and the dump cylinder 53 and by driving this hydraulic pump 60 at a rotational speed corresponding to the temperature of the implement work motor 3, traveling motor 2, etc. at other times, the implement work motor 3 and the traveling motor 2 can be effectively cooled with achieving energy saving, and high outputs can be obtained respectively from the implement work motor 3 and the traveling motor 2.

Alternatively, by driving the hydraulic pump 60 at a rated rotation at the time of driving of the mower lift cylinder 41, the lift cylinder 52 of the grass collecting device 5 and the dump cylinder 53 and by switching over this hydraulic pump 60 between a driven state and a stopped state corresponding to the temperature of the implement work motor 3, traveling motor 2, etc. at other times, the implement work motor 3 and the traveling motor 2 can be effectively cooled with achieving energy saving, and high outputs can be obtained respectively from the implement work motor 3 and the traveling motor 2.

Other Embodiments

Next, other embodiments which respectively add modifications to the foregoing embodiment will be explained. In these other embodiments as follows, these may be used in a plurality of combinations with the foregoing embodiment, as long as no contradiction occurs from such combination.

(1) In the foregoing embodiment, there was illustrated an arrangement in which the traveling motor 2 is supported to the transmission case 21 accommodating the gear transmission 21c. However, the invention is not particularly limited to this arrangement. For instance, the traveling motor 2 may be attached not to the transmission case 21, but to the machine body frame 10 either directly or via a separately provided attachment member (not shown).

For the rest of the configuration, the same arrangements as those of the foregoing embodiment may be employed.

(2) In the foregoing embodiment, there was illustrated an arrangement in which lubricant oil reserved in the transmission case 21 is used as the coolant for the traveling motor 2 and this lubricant oil is fed past the traveling motor 2 into the transmission case 21 so that cooling is effected by natural heat discharge from the transmission case 21 having a large heat discharging area. However, the invention is not particularly limited to this arrangement.

For instance, as indicated by virtual lines in FIG. 5, an oil cooler 7 may be incorporated in the course of the return oil passage 65 from the traveling motor 2 to the transmission case 21 so that the return oil may be forcibly cooled by the cooling action of this oil cooler 7.

The disposing position of such oil cooler 7 may by any appropriate position in the traveling machine body 1. For instance, a position under the driver's seat 18, a position inside the front hood 15, or any other position, may be selected with consideration to cooling efficiency, a pipe length, etc.

For the rest of the configuration, the same arrangements as those of the foregoing embodiment may be employed.

(3) In the foregoing embodiment, there was illustrated an arrangement in which the traveling motor 2 is of the oil cooled type having a cooling jacket 2b. However, the invention is not particularly limited to this arrangement. For instance, any other appropriate cooling means may be employed, such as cooling the traveling motor 2 by air cooling using a separately provided heat sink or cooling fan (not shown) or cooling with using a Peltier device or the like.

For the rest of the configuration, the same arrangements as those of the foregoing embodiment may be employed.

(4) In the foregoing embodiment, there was illustrated an arrangement in which the front portion of the traveling motor 2 is overlapped in the front/rear direction with the rear portion of the cutter blade housing 42 of the mower device 4. However, the invention is not particularly limited to this arrangement. For instance, it may be possible to arrange such that the cutter blade housing 42 of the mower device 4 and the traveling motor 2 are completely spaced apart from each other in the front/rear direction.

For the rest of the configuration, the same arrangements as those of the foregoing embodiment may be employed.

(5) In the foregoing embodiment, there was illustrated an arrangement in which the traveling motor 2 is located at a front portion of the transmission case 21. However, the invention is not particularly limited to this arrangement. For instance, conversely, the traveling motor 2 may be located at a rear portion of the transmission case 21, with the front portion of the traveling motor 2 being supported to the rear portion of the transmission case 21.

For the rest of the configuration, the same arrangements as those of the foregoing embodiment may be employed.

(6) In the foregoing embodiment, there was illustrated an arrangement in which the main frames 10A, 10A of the machine body frame 10 respectively has its front portion formed narrower than its rear portion. However, the invention is not particularly limited to this arrangement. For instance, the left/right width of the main frames 10A, 10A may be substantially same at both its front portion and its rear portion, thus being of same linear shape.

For the rest of the configuration, the same arrangements as those of the foregoing embodiment may be employed.

(7) In the foregoing embodiment, there was illustrated an arrangement in which the battery 16 is disposed inside the front hood 15. However, the invention is not particularly limited to this arrangement. For instance, any other appropriate arrangement may be employed such as an arrangement of the battery 16 being disposed at a machine body rear portion outside the front hood 15, an arrangement of it being disposed in distribution at both the rear portion and the front portion, etc.

For the rest of the configuration, the same arrangements as those of the foregoing embodiment may be employed.

(8) In the foregoing embodiment, there was illustrated an arrangement in which the traveling motor 2 and the implement work motor 3 are driven by electric power from the common battery 16. However, the invention is not particularly limited to this arrangement. For instance, any other appropriate arrangement may be employed such as an arrangement of the traveling motor 2 and the implement work motor 3 being driven respectively by electric powers from different batteries 16.

For the rest of the configuration, the same arrangements as those of the foregoing embodiment may be employed.

(9) The charger (not shown) for charging the battery 16 used in the foregoing embodiment may be of a vehicle-mounted type to be disposed at an appropriate portion on the traveling machine body or may be of a separate-mount type to be disposed at a portion separate from the traveling machine body.

INDUSTRIAL APPLICABILITY

The present invention is applicable not only to the riding electric grass cutting machine, but also to a walk-behind type electric grass cutting machine or an electric grass cutting machine configured for unmanned wireless maneuvering or an electric grass cutting machine configured for automatic traveling by artificial intelligence technology, etc.

DESCRIPTION OF SIGNS

1F: front wheel
1R: rear wheel
2: electric motor
4: mower device
6: oil circulation circuit
7: oil cooler
10: machine body frame
10A, 10A: main frame
15: front hood
16: battery
21: transmission case
42: cutter blade housing
43: rotary blade
44: conveying duct
50: grass collecting container

The invention claimed is:

1. An electric grass cutting machine comprising:
a traveling device having a pair of left and right front wheels and a pair of left and right rear wheels;
a mower device of a rear discharge type disposed under a machine body frame;
a grass collecting container supported to a rear portion of the machine body frame;
a single electric motor configured to drive the traveling device, the single electric motor being an oil cooled type having a cooling jacket;
a gear transmission configured to speed-change an output from the electric motor and to transmit the speed-changed output to the traveling device; and
a conveying duct extending rearward between the rear wheels and configured to guide cut grass pieces from the mower device to the grass collecting container,
wherein the conveying duct is disposed at a position on more left or right side than a center position between the left and right rear wheels,
wherein the electric motor and the gear transmission are disposed between the left and right rear wheels and arranged one after the other in the front/rear direction at positions laterally of the conveying duct, and
wherein an oil cooler is incorporated in an oil circulation circuit to the cooling jacket.

2. The electric grass cutting machine of claim 1, wherein the electric motor is supported to a transmission case that accommodates the gear transmission.

3. The electric grass cutting machine of claim 2, wherein: an amount of oil charged in the transmission case is supplied in circulation to the cooling jacket.

4. The electric grass cutting machine of claim 1, wherein in a front hood provided at a front portion of the machine body frame, there is accommodated a battery for feeding electric power to the electric motor.

5. The electric grass cutting machine of claim 4, wherein a left/right width of a pair of left and right main frames included in the machine body frame is set, at its front portion, to a width approximating a left/right width of the battery and set, at its rear portion, to a width which is greater than the width of the front portion and approximates a sum total of a left/right width of the electric motor and a left/right width of the conveying duct.

6. The electric grass cutting machine of claim 1, wherein:
the mower device includes a cutter blade housing that covers a plurality of rotary blades;
the mower device is supported to be movable to/from between an upper position close to the machine body frame and a lower position away from the machine body frame; and
the electric motor is disposed, relative to the mower device located at the upper position, at a position overlapped with the cutter blade housing in the front/rear direction, at a position offset from rotational paths of the rotary blades as seen in a plan view.

7. An electric grass cutting machine comprising:
a traveling device having a pair of left and right front wheels and a pair of left and right rear wheels;
a mower device of a rear discharge type disposed under a machine body frame;
a grass collecting container supported to a rear portion of the machine body frame;
an electric motor configured to drive the traveling device; and
a gear transmission configured to speed-change an output from the electric motor and to transmit the speed-changed output to the traveling device;
wherein the electric motor and the gear transmission are disposed between the left and right rear wheels and arranged one after the other in the front/rear direction at positions laterally of a conveying duct for guiding cut grass pieces from the mower device to the grass collecting container,
wherein the electric motor is supported to a transmission case that accommodates the gear transmission,
wherein the electric motor is an oil cooled type having a cooling jacket, and
wherein an amount of oil charged in the transmission case is supplied in circulation to the cooling jacket.

8. An electric grass cutting machine comprising:
a traveling device having a pair of left and right front wheels and a pair of left and right rear wheels;
a mower device of a rear discharge type disposed under a machine body frame;
a grass collecting container supported to a rear portion of the machine body frame;
an electric motor configured to drive the traveling device; and
a gear transmission configured to speed-change an output from the electric motor and to transmit the speed-changed output to the traveling device;
wherein the electric motor and the gear transmission are disposed between the left and right rear wheels and arranged one after the other in the front/rear direction at positions laterally of a conveying duct for guiding cut grass pieces from the mower device to the grass collecting container, wherein in a front hood provided at a front portion of the machine body frame, there is accommodated a battery for feeding electric power to the electric motor, and wherein a left/right width of a pair of left and right main frames included in the machine body frame is set, at its front portion, to a width approximating a left/right width of the battery and set, at its rear portion, to a width which is greater than the width of the front portion and approximates a sum total of a left/right width of the electric motor and a left/right width of the conveying duct.

9. An electric grass cutting machine comprising:

a traveling device having a pair of left and right front wheels and a pair of left and right rear wheels;

a mower device of a rear discharge type disposed under a machine body frame;

a grass collecting container supported to a rear portion of the machine body frame;

an electric motor configured to drive the traveling device; and a gear transmission configured to speed-change an output from the electric motor and to transmit the speed-changed output to the traveling device;

wherein the electric motor and the gear transmission are disposed between the left and right rear wheels and arranged one after the other in the front/rear direction at positions laterally of a conveying duct for guiding cut grass pieces from the mower device to the grass collecting container, wherein the mower device includes a cutter blade housing that covers a plurality of rotary blades, wherein the mower device is supported to be movable to/from between an upper position close to the machine body frame and a lower position away from the machine body frame, and wherein the electric motor is disposed, relative to the mower device located at the upper position, at a position overlapped with the cutter blade housing in the front/rear direction, at a position offset from rotational paths of the rotary blades as seen in a plan view.

* * * * *